United States Patent [19]
Lee

[11] Patent Number: 5,961,087
[45] Date of Patent: Oct. 5, 1999

[54] SUCTION-TYPE FIXING MECHANISM OF A FLAGPOLE FOR ADVERTISEMENT

[76] Inventor: Yoo-Sun Lee, 165-11, Nonhyun-Dong, Kangnam-Ku, Seoul, Rep. of Korea

[21] Appl. No.: 08/919,395

[22] Filed: Aug. 28, 1997

[51] Int. Cl.$^6$ ..................................................... A45D 42/14
[52] U.S. Cl. ........................ 248/362; 248/363; 248/205.5; 248/205.8
[58] Field of Search .................... 248/362, 363, 248/205.5, 205.8, 205.6, 205.7, 206.2, 309.1, 309.3, 310

[56] References Cited

U.S. PATENT DOCUMENTS

| | | | |
|---|---|---|---|
| 2,806,314 | 9/1957 | Moran ..................................... | 248/687 |
| 3,020,017 | 2/1962 | Watson .................................. | 248/205.8 |
| 3,863,568 | 2/1975 | Frederick ................................. | 102/13 |
| 4,580,751 | 4/1986 | Panzer .................................. | 248/205.8 |
| 4,601,255 | 7/1986 | Marcotti ................................. | 116/173 |
| 4,813,640 | 3/1989 | Perentin ............................... | 248/205.8 |
| 4,951,911 | 8/1990 | Zatopek et al. ........................ | 248/362 |
| 5,065,973 | 11/1991 | Wang ...................................... | 248/362 |
| 5,176,357 | 1/1993 | Hobart ................................... | 248/683 |
| 5,395,159 | 3/1995 | Pinto ..................................... | 297/395 |
| 5,423,466 | 6/1995 | Moon ..................................... | 224/324 |
| 5,454,540 | 10/1995 | McPerson et al. ....................... | 248/362 |

*Primary Examiner*—Derek J. Berger
*Assistant Examiner*—Tan Le
*Attorney, Agent, or Firm*—Marshall & Melhorn

[57] ABSTRACT

The present invention relates to a fixing mechanism to be used for mounting a flagpole for advertisement having a flag. The fixing mechanism according to the present invention comprises a suction part and adjustment handle wherein the mechanism can be simply and easily fixed on or separated from a show window or a display stand having a smooth surface by the simple suction of a suction part formed at the back, a fixing mechanism of a flagpole being integrally constructed on the upper side of a fixing hole enabling to rotate in both directions. As this fixing mechanism can be attached on the surface of a display stand or a shop, it can be mounted without giving any inconvenience to passersby on a sidewalk.

5 Claims, 4 Drawing Sheets

SUCTION-TYPE FIXING MECHANISM OF A FLAGPOLE FOR ADVERTISEMENT

BACKGROUND OF THE INVENTION

The present invention relates to a suction type fixing mechanism for putting up an ad flag in the outdoors for visual advertisement.

In general, to put up a flag for advertisement which is conspicuously installed at regular arrangements in the outdoors, installation of a heavy erection bar was required on the sidewalk of a commercial quarter. Accordingly, it was installed mostly on a footway, and thus caused inconvenience to passersby. Also, there were problems in installing lots of the flags.

Meanwhile, in order to remove inconveniences being caused by the installations to the passersby, a method for installing the flag in the air was devised. In this case, however, installation of a separate pole was required, and for the removal, lots of labor and working hours were required.

To solve the conventional problems described above, the present invention was conceived. A fixing mechanism according to the present invention has the structure of the suction type fixing mechanism of a flag for advertisement in which the flag can be easily and demountably installed on a show window. In relation to the fixing mechanism according to the present invention, a utility model application was filed with the Korean Industrial Property Office in 1998 by the present applicant(Utility Application No. 15367/96). The present invention is the improvement of the utility model application.

The invention according to the earlier filed application comprises one projection on the insertion part of a fixing bar fixing a flag on the upper body being fixed with a suction plate on the surface of a show window, and a plurality of direction holes having equal angles on a fixing hole being engaged with the projection, in which the flagpole attached when inserting the fixing bar is inserted in an upright position to be in line with the direction hole having a specific position.

In the event that a fixing method according to the earlier filed application is used, the fixing method had a drawback which the fixing bar should be removed and rotated in a direction for adjustment, and then inserted again, to change a direction for putting up the flag.

SUMMARY OF THE INVENTION

The present invention was conceived to supplement the conventional drawbacks described in the above and an object of the present invention is to provide a suction type fixing mechanism for putting up an ad flag in the outdoors for visual advertisement, in which after installing the flagpole, the direction of the flagpole is simply and easily changed without separation from it.

BRIEF DESCRIPTION OF THE DRAWINGS

FIG. 5 is a side sectional view illustrating another example of the present invention.

FIG. 6 is a section view taken on line B—B of FIG. 5 according to the present invention.

DETAILED DESCRIPTION OF THE PREFERRED EMBODIMENT

Hereinafter, the construction of the present invention will be described with reference to the accompanying drawings.

Figure 1:
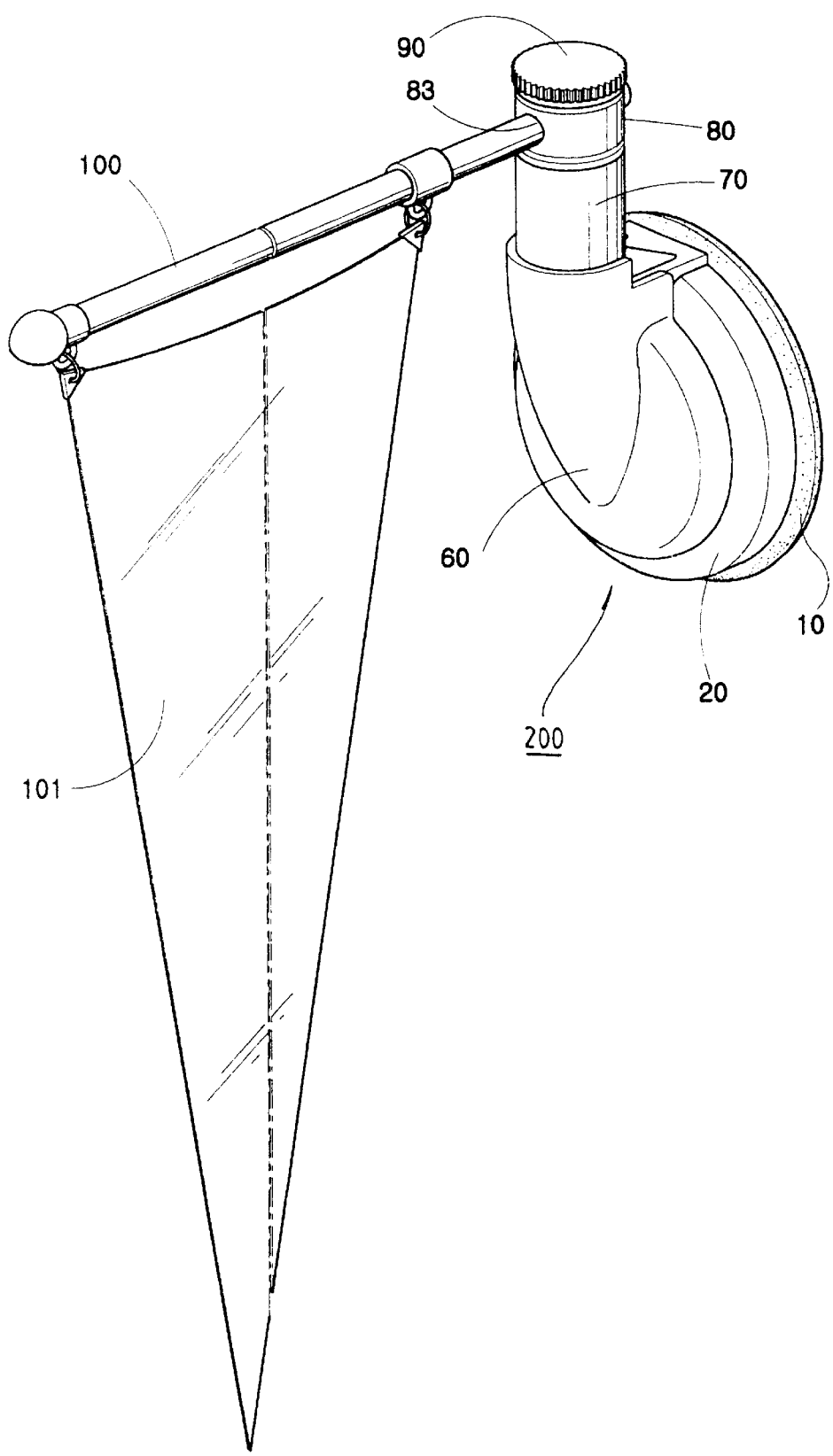
FIG. 1 is a perspective view illustrating the use state of the present invention.

FIG. 1 is a general perspective view illustrating the use state of the present invention. A suction handle 40 is mounted at the front center of a fixing body 20 having a suction installation part 10 made of a rubber on the back, to drive the suction installation part 10 and to finish with a cover 60 on the front, and on an upper portion of the fixing body 20 a step boss 70 and a rotor 80 are mounted and fixed with a fixing mechanism for a flagpole fixing a flagpole 100.

Figure 2:
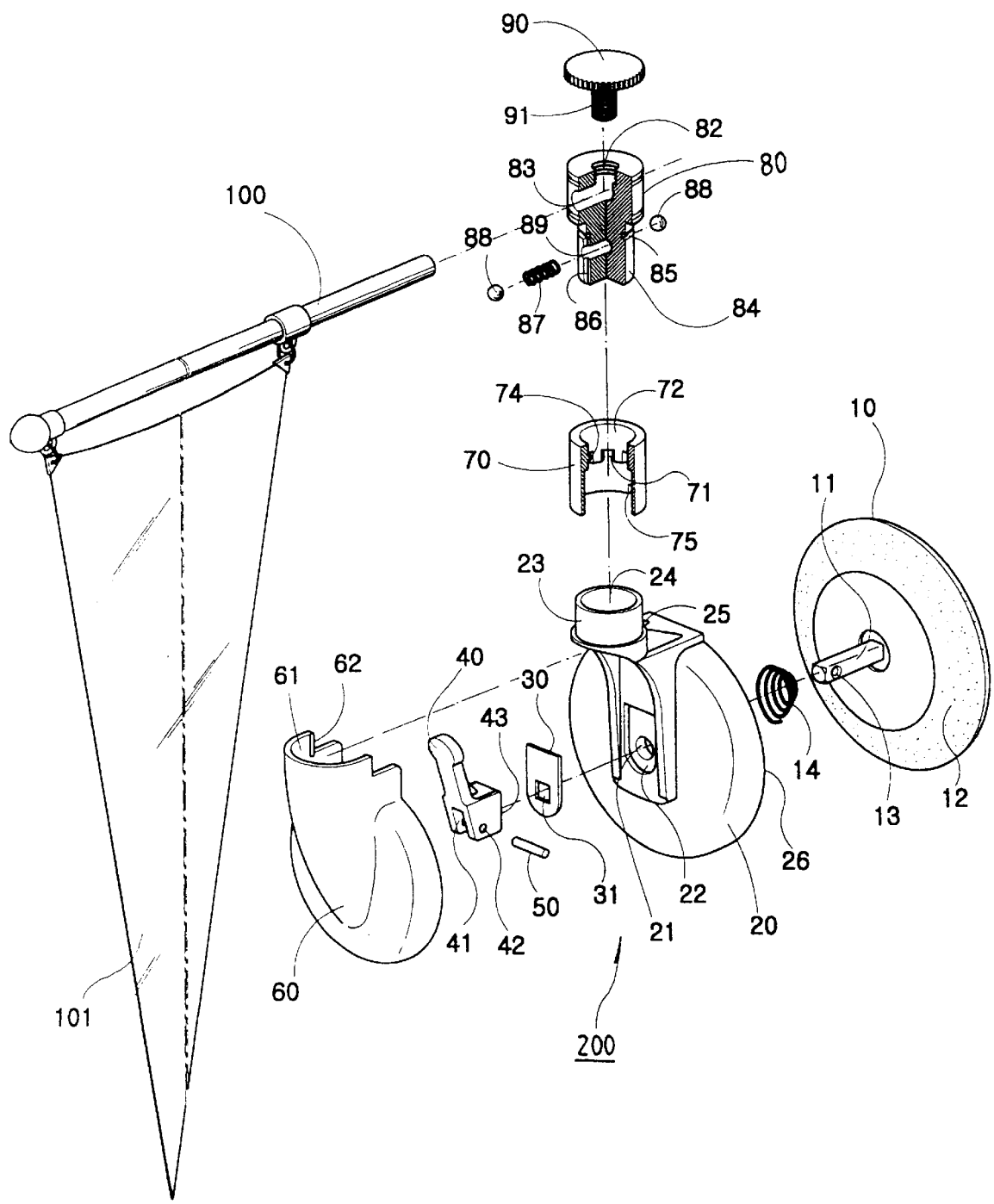
FIG. 2 is an exploded perspective view of the present invention.

Such a fixing mechanism for a flagpole 200 comprises, as shown in FIG. 2, the suction part 10 being assembled from the back of the fixing body having a square pull-stem 11 drilling a pull-groove 13 on the inner center of a dish shaped suction plate 12 made of a rubber in which a slack spring 14 such as a conical compression spring is inserted to pass through a cavity 21 drilled in the middle of a plane part of the fixing body 20 which is hollow to the inner side from the back, and projecting over the front of the fixing body 20, and is placed on a support groove 22 formed in front of the fixing body 20 so that the cavity 31 on the support 30 can be in line with the pull-stem 11.

The suction handle 40 is attached to the pull-stem 11 projected in such a state. If a fixing pin 50 is inserted after placing the pull-groove 13 of the pull-stem 11 to be in line with a pin hole 42 drilled at right angles by inserting a pull-stem groove 41 formed at the lower suction handle 40 into the pull-stem 11, an isolation jaw 43 which is the rear part of the suction handle 40 is assembled into a support 30.

Further, an extension part 26 upwardly extending from the front of the fixing body 20 is supporting a rotary cylinder 23, and in the middle of it a rotation groove 24 is drilled, and on a peripheral curved surface of the back side a positioning jaw 25 is projecting.

The step boss 70 is attached to the rotary cylinder 23. In the center a rotary groove 72 is drilled, in the inner middle part a plurality of step groove 71 is formed at equal angles, in the inner front a retaining jaw 74 is projecting, and at the lower back side a positioning groove 75 is formed so as to be fixedly assembled with the positioning jaw 25 formed at the back side of the rotary cylinder 23.

The rotor 80 is inserted into the rotary groove 72 of the assembled step boss 70. This rotor 80 includes a horizontal flagpole fixing hole 83 facing toward the front of the rotor 80 on the upper side a vertically penetrating set screw groove 82 is drilled, at the lower side a rotary part 84 having a slightly narrower thickness than as the diameter of the aforesaid rotary groove 72, an inserting groove 86 vertically caved on the peripheral curved surface in the front of it, a horizontally caved retaining groove 85 is formed on the whole girth of the peripheral curved surface, in the middle part of the inserting groove 86 a stem groove 89 facing toward the front is horizontally drilled and inserted into the middle part of the stem groove 89 is a step spring 87 having the structure of a compression spring, for the assembly the rotary part 84 is inserted into the rotary groove 72 by inserting a step ball 88 on both sides, so that the inserting groove 86 is in line with the retaining jaw 74. Consequently, the assembly is completed when the step ball 88 inserted into the stem groove 89 is in line with the step groove 71. Rotating the rotor 80 by 180° in the assembled state to prevent the separation of the rotor 80 from the step boss 70, the retaining jaw 74 is placed on the retaining groove 85, and the step balls 88 are latched on a certain position of the step groove 71 to maintain the rotated certain position, thereby the rotor 80 is not separated from the step boss 70.

In such a state that the step boss 70 is completely assembled into the rotor 80, the flagpole 100 having a flag is inserted into the fixing hole 83 and then by fastening a fixing mechanism for a flagpole having a set screw 91 in the middle of the set screw groove 82, the separation of the flagpole is prevented.

Also, in the front side of the fixing body 20 a handle 44 portion is protected by wrapping the cover 60, a rotary part cover 61 formed at the upper part for the beautiful appearance is in contact with the portion of the step boss 70, and a cover fixing jaw 62 formed at the end is mounted. Unexplained reference numeral, "W" in FIG. 3 represents a show window.

The operation of the present invention having such construction is described hereafter.

Figure 3:
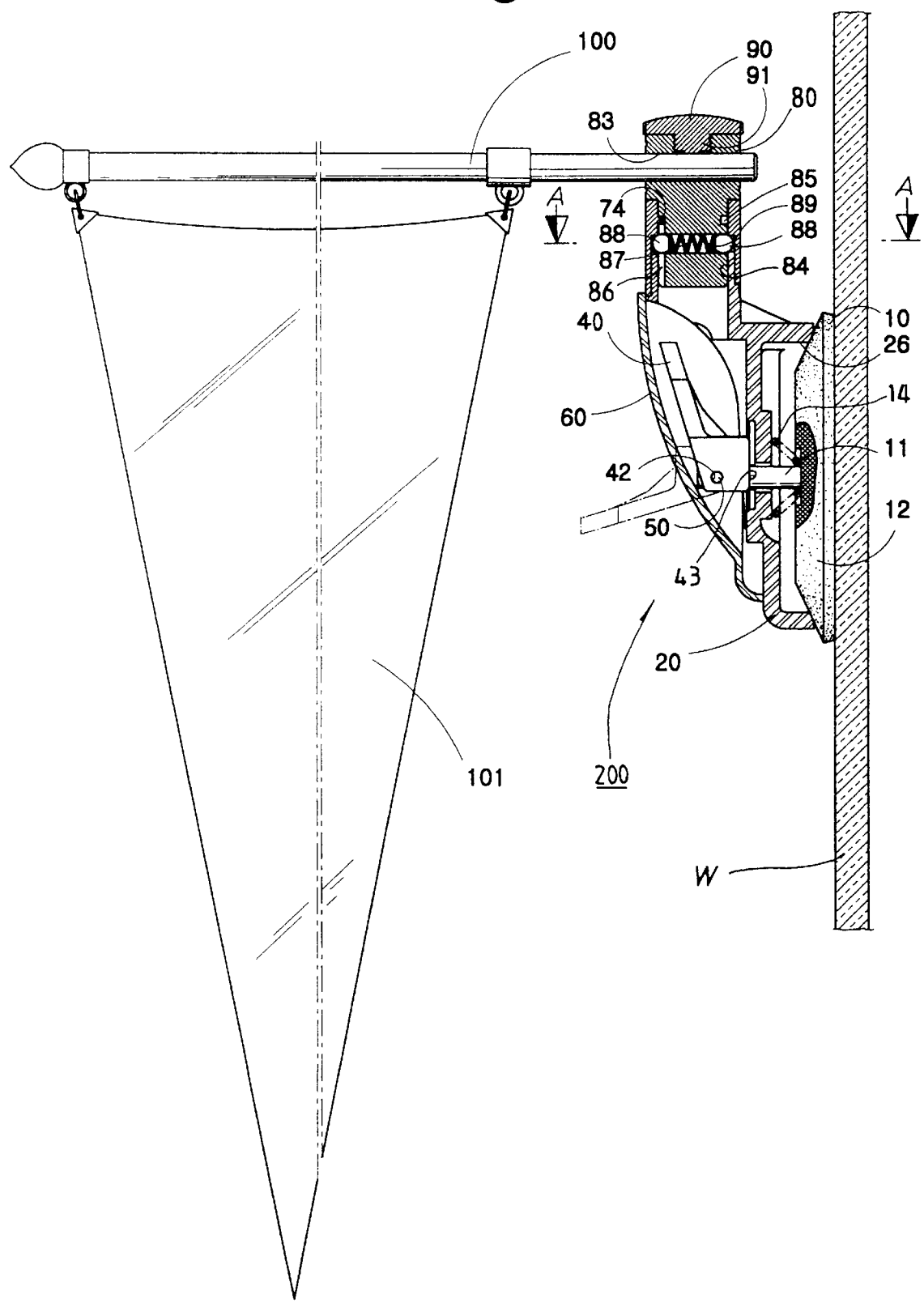
FIG. 3 is a side sectional view illustrating the center of present invention.

FIG. 3 is a side sectional view illustrating the center of the present invention. The flagpole 100 is inserted into the fixing hole 83 drilled on the rotor 80 attached to the upper side of the fixing body 20, the set screw 91 of the fixing screw 90 is fastened with a screw through the set screw groove 82 drilled at right angles in the middle of the upper side to press the flagpole inserted to the inside so that the flagpole 100 cannot be separated therefrom. Separating the cover 60 wrapped in the front of the fixing body 20, the suction handle 40 mounted inside is exposed. Rotating the suction handle 40 by pulling it downwardly as indicated in a dotted line shown in FIG. 3 the suction handle 40 is rotated centering around the fixing pin 50 mounted on the pin hole 42, the pull-stem 11 extended from the center of the suction part 10 is unfastened loosely, and thus by means of the elastic force of the slack spring 14 mounted between the inner side of the fixing body 20 and the suction plate 12, a dish shaped space having the suction plate 12 formed in contact with the extension part 26 of the fixing body 20 is vanished.

In such a state that installation preparations pursuant to the operation of the suction handle 40 are completed, the fixing body 20 is pressed so that the flagpole 100 in the predetermined proper position outside the show window(W) of a shop or display stand faces upwardly and in the direction which the suction part 10 is in contact with. After that, rotating the suction handle 40 by pulling it upwardly, the pull-stem 11 extended from the center of the suction plate 12 is pulled at the interval between the isolation jaw 43 and pin hole 42, and thus a space between the suction plate 12 and show window(W) is formed to produce a vacuum while the outer periphery of the suction plate 12 is kept in touch with the suction plate supporting frame 26 of the fixing body 20, so that the fixing body 20 can be securely fixed to the show window(W), and for the prevention of the exposure of the suction handle 40 and neat and tidy appearance, the front surface of the fixing body 20 is wrapped with the cover 60.

The flagpole 100 mounted on the upper side of the fixing body 20 fixed as described above is normally established to have a direction in right angles toward the front. As the case may be, where variation of visual position for a flag 101 attached to the flagpole 100 or the different direction of the flagpole 100 is required according to the installed environments, the present invention is constructed to rotate the flagpole 100.

Figure 4:
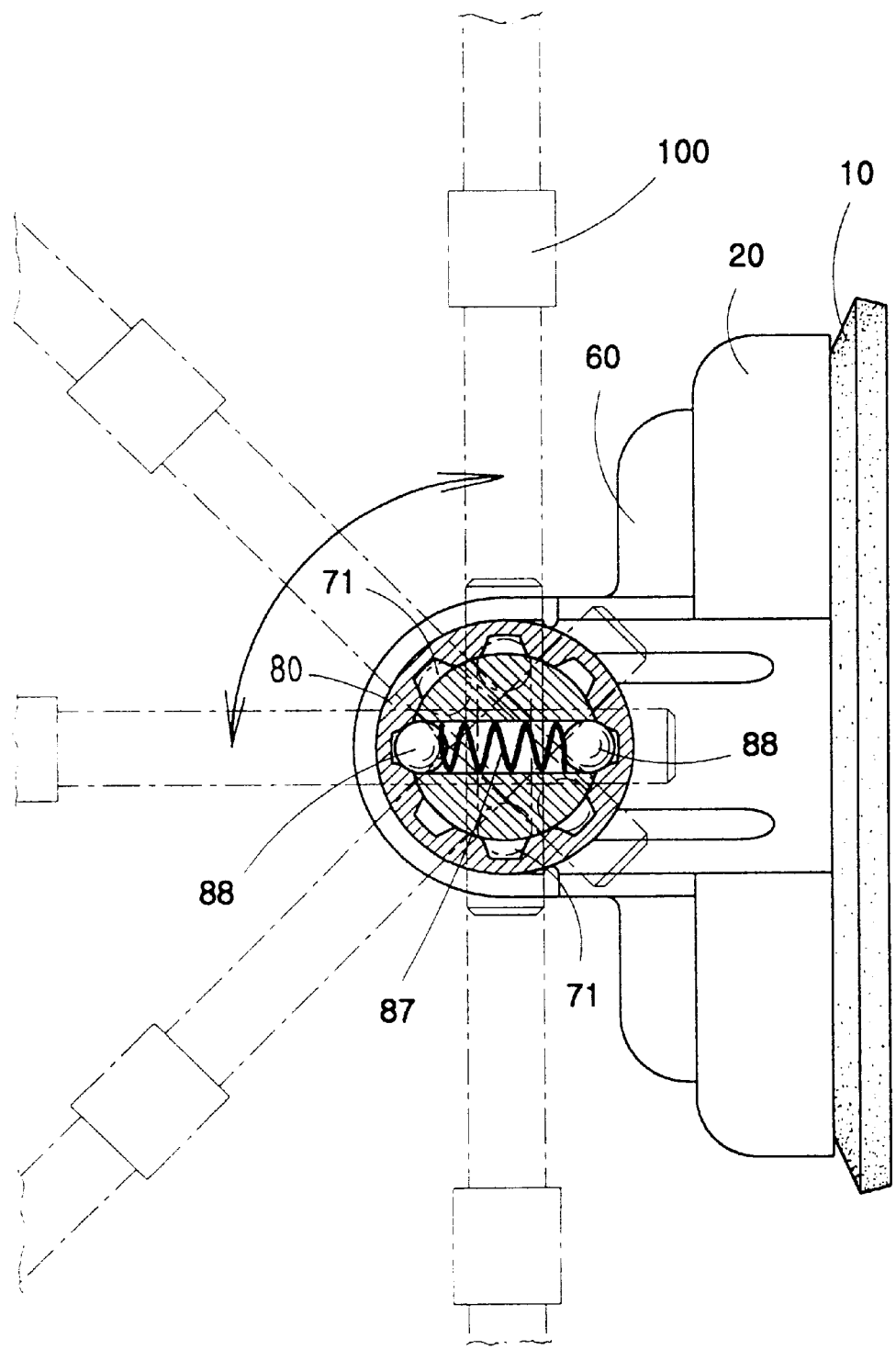
FIG. 4 is a section view taken on line A—A of FIG. 3 according to the present invention.

In order to have the different direction of the flagpole 100 as described above, it is required to rotate the flagpole 100 to the direction which users want in the state that the fixing body 20 is attached to the show window(W). Rotating the flagpole 100 in such a state that the step ball 88 inserted by receiving a compressive force on the both sides of the step spring 87 mounted on the step groove 89 drilled in the middle of the rotation part 84 integrally formed on the upper rotor 80 as shown in FIG. 4 is safely placed at the rotary groove 72 formed in the inner middle of the step boss 70, the rotation part 84 of the rotor 80 is rotated at the rotary groove 72 of the step boss 70, and at the same time, the step ball 88 mounted Inside the stem groove formed in it is rotated.

With the rotor 80 being rotated at that time, the step ball 88 presses the step spring 87 inside and thus is pressed in to go over a jaw having the step groove 71. The step ball 88 is safely placed at the step groove 71 extended in a direction being rotated, and thus the predetermined direction being placed by the rotation of the flagpole 100 is maintained.

In order to mount the flagpole according to the present invention having such operation, it will be easy to put up the flagpole in any place having a smooth and considerably hard surface.

The present invention has the advantage which the flagpole can be mounted without installing the heavy and voluminous pole and without securing a space which were required for the conventional method for mounting the flagpole. Consequently, the fixing mechanism for mounting the flagpole according to the present invention enables to securely and easily install the flagpole in a certain location of a show window or a shop.

In the meantime, it is obviously understood by the person skilled in the art that the present invention is not limited to the particular examples disclosed herein for carrying out the present invention, and that various alteration or modification thereof can be made within the present invention.

What is claimed is:

1. A suction type fixing mechanism of a flagpole for advertisement comprising:

a suction part for producing a vacuum and suction having a square-built pull-stem with a pull-groove drilled in an inner middle portion of a suction plate on a back side of a fixing body, wherein a slack spring is inserted to pass through a cavity of the fixing body, a pull-stem groove formed at a lower suction handle is inserted into the pull-stem so that a pin hole is in line with the pull-groove of the pull-stem, and then a fixing pin is inserted;

an extension part upwardly extending from a front side of said fixing body integrally supporting a rotary cylinder, a step boss attached to a peripheral curved surface of the rotary cylinder a positioning jaw projecting from the peripheral curved surface, a rotary groove being drilled in a center of the step boss, a plurality of step grooves formed at equal angles in an inner middle portion of the step boss, a retaining jaw protruding outward from an inner front of the step boss, a positioning groove being formed at a lower back of the step boss so as to be in line with the positioning jaw formed on the peripheral curved surface;

a rotor inserted into the rotary groove of said step boss to pass through a horizontal fixing hole facing toward the front, a set screw groove vertically penetrating on an upper side of the rotor, an inserting groove formed on a peripheral curved surface of the rotor, and a horizontally caved retaining groove formed on a whole girth of the peripheral curved surface of the rotor;

a stem groove disposed in a middle part of the inserting groove and facing toward a front side of the rotor, horizontally drilled and inserted into a middle part of a step spring having a structure of a compression spring, a rotary part inserted into the rotary groove by inserting a step ball on both sides, and the inserting groove being in line with the retaining jaw so that the step ball inserted into the stem groove is in line with the step groove;

a flagpole having a flag being inserted into a flagpole fixing groove, wherein a fixing mechanism of a flagpole having a set screw in the middle is fastened with the set screw groove so as to prevent the separation of the flagpole; and by wrapping a cover over the front side of the fixing body a rotary part cover formed at the top being in touch with the step boss to protect a handle portion, and a cover fixing jaw formed at the end being maintained.

2. A suction type fixing mechanism of a flagpole comprising an extension part upwardly extended from a front of a fixing body integrally supporting a rotary cylinder; a step boss being attached to a peripheral curved surface of the rotary cylinder having a positioning jaw projecting from the rotary cylinder; a rotary groove being drilled in a center portion of the step boss; a plurality of step grooves being formed at equal angles in an inner middle section of a retaining jaw; a positioning groove being formed at a lower back surface of the step boss so as to be in line with the positioning jaw formed on a back surface of the rotary cylinder; a rotor being inserted into the rotary groove of the step boss to pass through a horizontal fixing hole facing toward the front; a set screw groove vertically penetrating on an upper side being drilled; and an inserting groove being formed at a peripheral curved surface of the rotor and a horizontally caved retaining groove being formed on the peripheral curved surface of the rotor.

3. A suction type fixing mechanism of a flagpole comprising an extension part upwardly extended from a front of a fixing body integrally supporting a rotary cylinder; a step boss being attached to a peripheral curved surface of the rotary cylinder having a positioning jaw projecting from the rotary cylinder; a rotary groove being drilled in a center portion of the step boss; a plurality of step grooves being formed at equal angles in an inner middle section of a retaining jaw; a positioning groove being formed at a lower back surface of the step boss so as to be in line with the positioning jaw formed on a back surface of the rotary cylinder; a rotor being inserted into the rotary groove of the step boss to pass through a horizontal fixing hole facing toward the front; a set screw groove vertically penetrating on an upper side being drilled; an inserting groove being formed at a peripheral curved surface of the rotor, the inserting groove having a middle part including a stem groove and a horizontally caved retaining groove being formed on the peripheral curved surface of the rotor; a step spring having a structure of a compression spring inserted into the stem groove; and a flagpole having a flag being inserted into a flagpole fixing groove.

4. A suction type fixing mechanism of a flagpole as defined in claim 3, further comprising a set screw to secure the flagpole in the flagpole fixing groove.

5. A suction type fixing mechanism of a flagpole as defined in claim 3, further comprising a cover over the front of the fixing body; a rotary part cover formed at the top being in touch with the step boss to protect a handle portion; and a cover fixing jaw formed at the end being maintained.

* * * * *